United States Patent [19]

Taylor

[11] 4,300,585
[45] Nov. 17, 1981

[54] AUTOMATIC DUMP VALVE

[75] Inventor: Donald F. Taylor, Dallas, Tex.

[73] Assignee: Sedco, Inc., Dallas, Tex.

[21] Appl. No.: 58,927

[22] Filed: Jul. 19, 1979

[51] Int. Cl.³ ............................................. G05D 7/01
[52] U.S. Cl. .................................. 137/107; 92/98 D; 92/105; 92/107; 251/58; 251/284; 137/527.8; 91/468
[58] Field of Search ............... 417/299, 300; 137/107, 137/102, 117, 304, 306, 527.8; 92/98 D, 100, 105, 107; 91/417, 451, 452, 468; 251/58, 62, 145, 284, 286

[56] References Cited

U.S. PATENT DOCUMENTS

| | | | |
|---|---|---|---|
| 357,919 | 2/1887 | Gosch | 251/145 |
| 1,200,844 | 10/1916 | Johnson | 251/145 |
| 3,180,235 | 4/1965 | Schmitz | 92/98 D |
| 3,307,576 | 3/1967 | Himes et al. | 137/527.8 |
| 3,318,327 | 5/1967 | Himes et al. | 137/527.8 |
| 3,736,077 | 5/1973 | Dane, Jr. | 417/424 |
| 3,870,436 | 3/1975 | Remy | 417/299 |
| 3,945,394 | 3/1976 | Sullivan et al. | 137/430 |
| 3,957,075 | 5/1976 | Kunz et al. | 137/117 |
| 4,098,285 | 7/1978 | Karing | 137/117 |

Primary Examiner—H. Jay Spiegel
Attorney, Agent, or Firm—Hubbard, Thurman, Turner, Tucker & Glaser

[57] ABSTRACT

A valve for automatically dumping a load of solids entrained within a fluid transport medium in response to flow interruption is disclosed. The automatic dump valve is particularly well-suited for use in combination with a nodule transport riser in deep ocean mining operations. The automatic dump valve system is combined with a tubular conduit defining a longitudinally extending flow passage having a sidewall opening defining a dump port. The automatic dump valve assembly includes a movable dump port cover plate and a hydraulic actuator coupled to the cover plate. The hydraulic actuator is operably responsive to pressure changes within the flow passage relative to the pressure exerted by a surrounding body of water to open and close the dump port. The hydraulic actuator is formed by the combination of a sidewall portion of the tubular conduit constricting the flow passage thereby defining a venturi flow region, and a pressure chamber housing enclosing the conduit section and defining an annular pressure chamber. The pressure chamber is divided by a movable piston into a first chamber which is connected in fluid communication with the venturi passage, and a second pressure chamber which is exposed to hydraulic pressure exerted by the surrounding body of water. The dump valve further includes a deflector plate mounted within the tubular housing for movement from a clear passage position to a dump position, with the deflector plate extending from the dump port transversely through the flow passage in the dump position thereby defining a bypass channel for diverting settling solids through the dump port.

9 Claims, 10 Drawing Figures

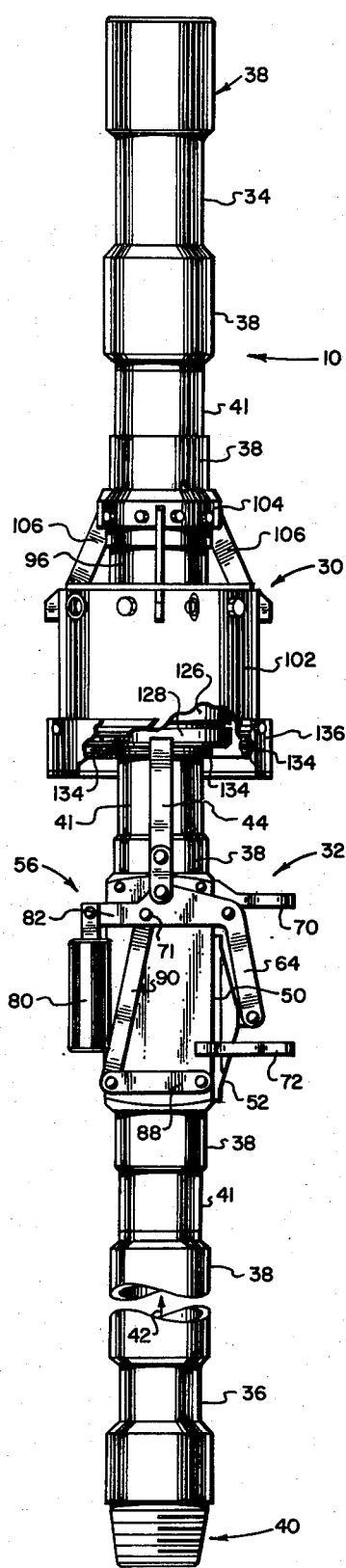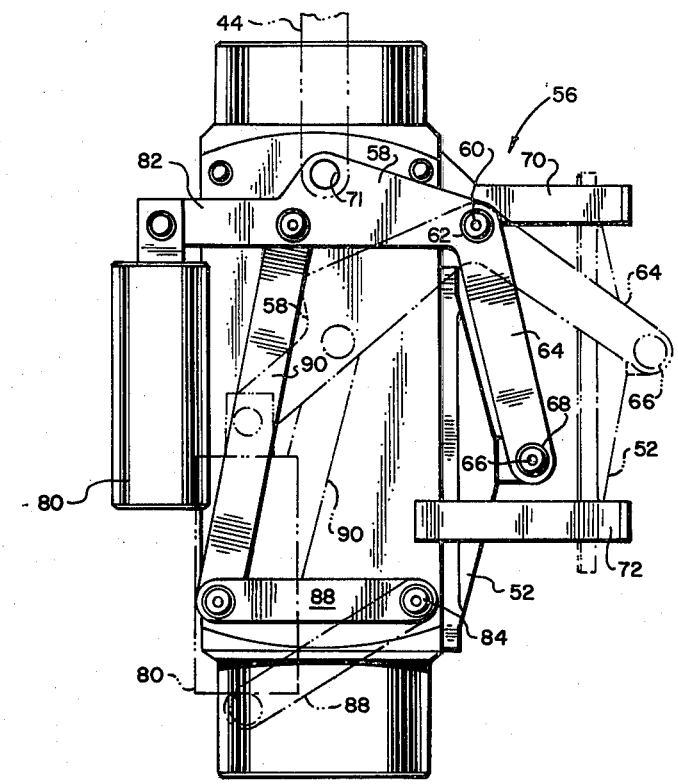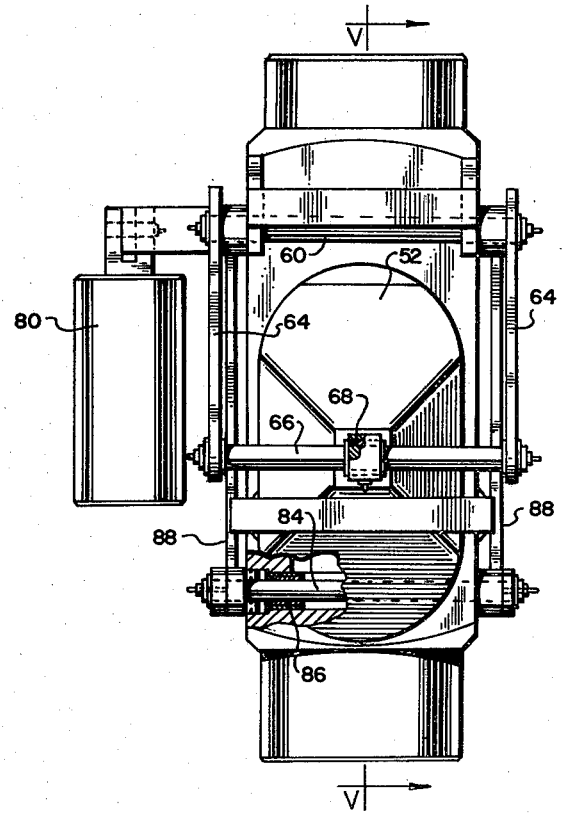
FIG. 2
FIG. 3
FIG. 4

AUTOMATIC DUMP VALVE

BACKGROUND OF THE INVENTION

1. Field of the Invention

The claimed invention relates to hydraulic control apparatus, and more particularly to the construction of a dump valve for automatically evacuating entrained solids from a transmission line in response to flow interruption.

2. Description of the Prior Art

It is common practice to convey particulated solids over great distances and elevations by entraining the solids in a fluid transport medium such as a moving stream of water. The entrained solids and water define a slurry which is pumped or otherwise lifted through a transmission conduit at a sufficiently rapid flow rate to prevent settling of the solids in the conduit. When slurry flow is interrupted, the heavier solids, which have a greater specific gravity than the fluid transport medium, settle within the conduit under the influence of gravity. The accumulation of settling solids may cause bridging within the conduit thereby obstructing the flow passage. Additionally, for vertical or substantially inclined conduits, the settling of solids within the conduit may obscure the flow passage to such an extent that it is not practically possible to reestablish slurry flow. Also the descending solids may clog or damage equipment to which the conduit is connected at the lower end. Therefore it is desirable, and in many instances, it is practically necessary to provide means for rapidly evacuating descending solids from a slurry transmission line.

The ability to automatically evacuate or discharge settling solids, without requirement of attention or control, and without providing actuating power, is particularly important where a slurry is being transported upwardly through a great length of conduit from a location which is relatively inaccessible. A good example of such a situation is a deep ocean mining operation in which a marine riser conduit may extend as much as fifteen thousand feet or more from a collector vehicle traversing the ocean floor to a surface vessel. Inasmuch as several tons of nodules may be entrained within the riser conduit, the interruption of slurry flow through the riser conduit will cause immediate bridging as the nodules settle and may possibly damage the collector vehicle. Furthermore, because of the inertia of the large mass of accumulated nodules, it is practically impossible to reestablish slurry flow after a substantial portion of the riser becomes blocked.

The upward movement of slurry within the riser conduit may be interrupted due to a number of causes. For example, the nodules may become temporarily jammed within the riser or be so numerous and close to one another along a length of the riser that the riser flow passage becomes blocked or obstructed. On the other hand, the pump or lift means for inducing slurry flow may fail. Because the riser conduit is pendulously suspended from the surface vessel, it extends substantially vertically downwardly from the surface vessel to the ocean floor. Upon the interruption of the slurry flow, the nodules within the riser having a substantially greater specific gravity settle by gravity flow through the conduit. It is apparent that if all of the nodules were to settle within the riser conduit along a substantial length of the conduit, bridging of the conduit flow passage would occur immediately and the nodule collector vehicle would be subjected to the tremendous mass of the column of nodules accumulated within the riser flow passage. Under such conditions, it is practically impossible to induce the flow of sea water through the riser conduit at a sufficient velocity to re-entrain the nodules and move them upwardly within the riser conduit to the surface vessel.

OBJECTS OF THE INVENTION

It is, therefore, the principal object of the present invention to provide a dump valve which is especially adapted for evacuating or discharging solids which settle within a conduit in response to the interruption of slurry flow through the conduit.

A related object of the invention is the provision of a valve for rapidly dumping entrained solids from a slurry conduit automatically in response to the interruption of slurry flow without operator supervision or independent actuating power.

Another object of the invention is the provision of an automatic dump valve which is substantially nonresponsive to hydraulic pressure fluctuations associated with normal slurry flow, and which is capable of effecting the rapid diversion of settling solids from a conduit in response to a substantial interruption of slurry flow.

Yet another object of the invention is to provide an automatic dump valve system which automatically opens to its discharge position upon a predetermined change or interruption of slurry flow within a conduit to cause settling solids to be discharged out of the conduit.

Still another object of the present invention is to provide a dump valve especially adapted for use in the slurry riser of an underwater mining or dredging system which is suitable for use at great depths and under high pressures, and further where the normal operating pressure within the slurry riser is less than the hydraulic pressure exerted by the surrounding body of water.

A further object of the invention is the provision of a dump valve system which automatically opens a bypass channel in a slurry conduit in response to the interruption of slurry flow, passively diverts settling solids through the bypass channel and automatically closes the bypass channel in response to the resumption of fluid flow through the conduit at a rate sufficient to entrain the solids.

Yet another object of the invention is the provision of a dump valve system having a deflector plate which is automatically positioned for passively diverting settling solids out of a conduit in response to the interruption of slurry flow.

SUMMARY OF THE INVENTION

The foregoing objectives are achieved by an automatic dump valve system which is capable of dumping a load of solids entrained within a fluid transport medium in response to flow interruption. The automatic dump valve system is combined with a tubular conduit defining a longitudinally extending flow passage having a sidewall opening defining a dump port. The automatic dump valve assembly comprises generally a movable dump port cover plate and a hydraulic actuator coupled to the cover plate. The hydraulic actuator is operably responsive to pressure changes within the flow passage relative to the ambient pressure exerted by a surrounding body of water to open and close the dump port. The hydraulic actuator is formed by a sidewall portion of the tubular conduit which constricts the flow passage thereby defining a venturi flow region in combination with a pressure chamber housing enclosing the conduit section and defining an annular pressure chamber. The pressure chamber is divided by a movable piston into a sealed chamber which is connected in fluid communication with the venturi passage, and an open ended pressure chamber which is exposed to pressurization by an external fluid pressure source such as the ambient hydraulic pressure of a surrounding body of water.

In a preferred embodiment, the dump valve assembly further includes a deflector plate mounted within the tubular housing for movement from a clear passage position to a dump position, with the deflector plate extending from the dump port transversely through the flow passage in the dump position thereby defining a bypass channel for diverting settling solids through the dump port. The cover plate is mounted on the tubular conduit for movement from a position of sealing engagement with the dump port to an open port position. The deflector plate and cover plate are interconnected by control linkage which coordinates movement of the cover plate relative to movement of the deflector plate whereby the cover plate is moved to the position of sealing engagement with the dump port when the deflector plate is moved to the clear passage position, and the cover plate is moved to the open port position when the deflector plate is moved to the dump position.

During normal flow conditions, a relatively low hydraulic pressure condition is induced within the venturi passage. Because the venturi passage is connected in fluid communication with the sealed pressure chamber, it becomes pressurized at a level substantially equal to the hydraulic pressure in the venturi passage. With one side of the piston being exposed to this relatively low hydraulic pressure, and the opposite side of the piston being exposed to the relatively high ambient pressure of the surrounding body of water, a pressure differential is produced which causes the piston to be retracted. The cover plate is driven to its closed position and the deflector plate is retracted to the clear passage position in response to retraction of the piston. Should substantial interruption of the slurry flow occur for any reason, the relatively low pressure in the venturi region rises to equal that of the pressure of the surrounding body of water. This causes the sealed pressure chamber to produce no upward closing force on the chamber's piston, and allows a counterweight, acting on a lever arm to move arcuately, both the cover plate, and deflector plate to their respective open, and deflecting positions, while at the same time pulling the piston downward to its most extended position within the pressure chamber.

Should the entrained solids in the tubular eductor conduit be fairly large discrete objects within the entrained sea water, then the low pressure inside of the venturi portion of the dump valve assembly would be only that induced by the increased velocity of the sea water itself. This pressure difference is enough to cause the piston to overcome the force of the counterbalance and to start the piston to retract while the cover plate is yet full open, and the deflector tongue remains diagonally across the interior of the conduit.

Of course, if the entrained solids were of a mechanical suspension, and in partial solution, then the resulting density of the fluids flowing in the eductor conduit would be substantially more than that of the sea water outside of the conduit, and the instantaneous hydrostatic pressures inside of the conduit would reflect this condition; and then, should a substantial interruption of the mixture of slurry and entrained solids occur for any reason, a relatively high pressure is developed within the venturi region because of the greater density of the standing slurry mixture relative to the density of the surrounding body of water. This causes the sealed pressure chamber to be pressurized to a level relatively greater than the pressure exerted by the surrounding body of water, thereby extending the piston, opening the cover plate and extending the deflector plate transversely across the flow passage.

In the dump position, the deflector plate in combination with the dump port defines a steeply inclined bypass channel for discharging settling solids. As the solids settle within the conduit, they strike the deflector plate and are diverted through the dump port.

After the solids have been dumped, the cover plate and deflector plate are temporarily maintained in the dump position by the hydraulic actuator since the pressure in the venturi region and in the sealed pressure chamber is substantially equal to the pressure exerted by the surrounding body of water thereby dissipating the buildup of the hydraulic pressure across the piston. However, as fluid flow is reestablished by circulating water from the surrounding body of water through the open dump port, and through the conduit, the hydraulic pressure level in the venturi region drops, thereby inducing a pressure difference across the piston, and causing it to be fully retracted. Retraction of the piston drives the cover plate to its position of sealing engagement with the dump port, and drives the deflector plate to its clear passage position.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

BRIEF DESCRIPTION OF THE DRAWINGS

FIG. 2 is an elevation view, partly in section, which illustrates a preferred embodiment of the dump valve assembly;

FIG. 3 is a front elevation view of the dump valve assembly;

FIG. 4 is a top plan view of the dump valve shown in FIG. 3;

DESCRIPTION OF THE PREFERRED EMBODIMENT

Figure 1:
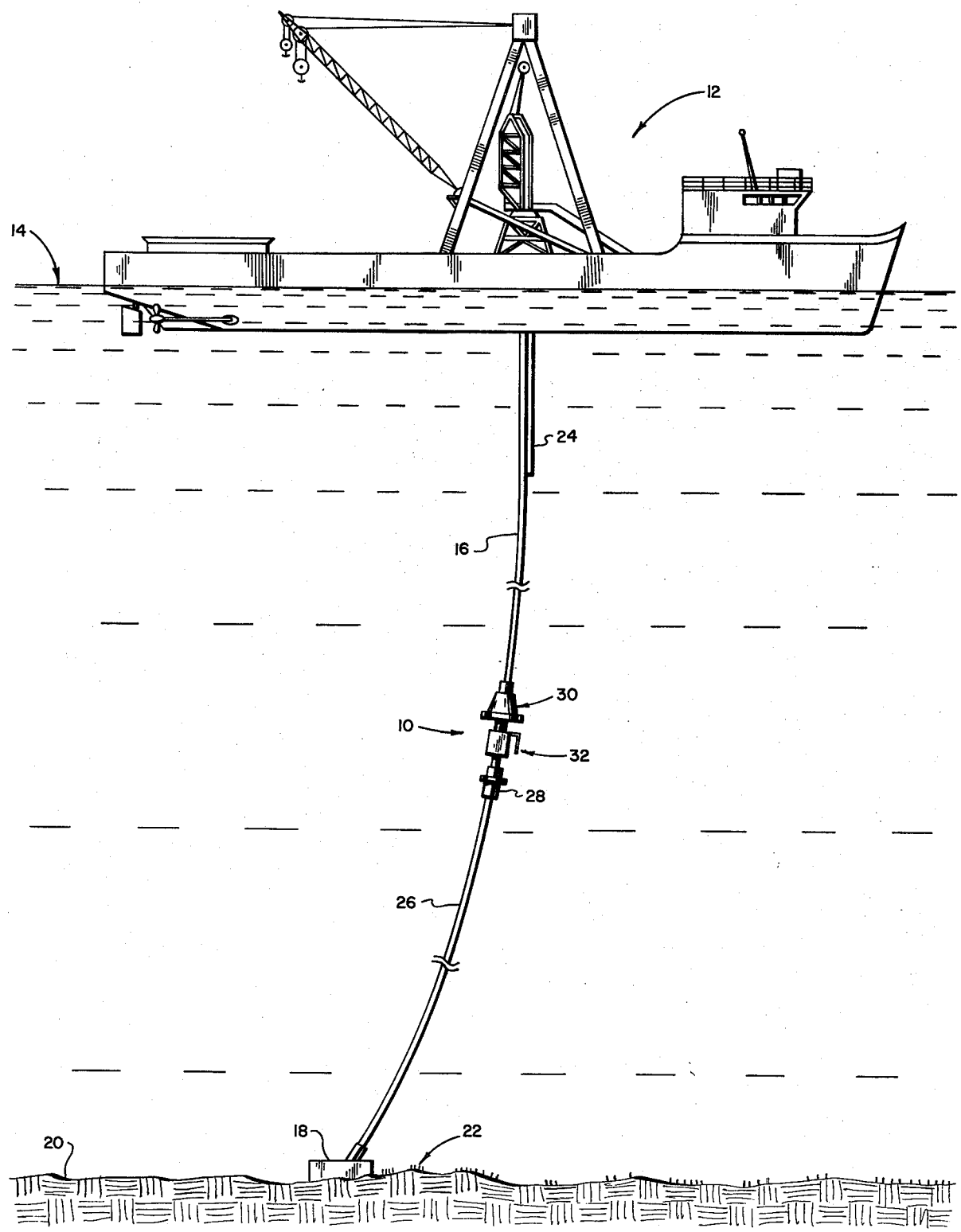
FIG. 1 is a simplified elevation view showing the dump valve assembly of the invention in combination with the marine riser of a deep ocean mining system.

In the description which follows, like parts are marked throughout the specification and drawings with the same reference numerals, respectively. The drawings are not necessarily to scale and in some instances portions have been exaggerated in order to more clearly depict certain features of the invention.

According to broad aspects of the invention, the dump valve system may be utilized in a number of applications involving the transportation of solids entrained in a moving fluid transport medium. The dump valve assembly is especially well-suited for use in underwater mining or dredging operations, and in particular for deep ocean mining operations wherein solids such as manganese nodules are transported through a marine riser conduit from a relatively inaccessible location on the ocean floor to a surface vessel over great distances of up to fifteen thousand feet or more. A preferred embodiment of the invention suitable for use in a deep ocean mining operation will now be described.

Referring now to FIGS. 1 and 2 of the drawing, a dump sub 10 is shown incorporated as a part of the marine riser in a deep ocean mining system including a surface vessel 12 floating in a large body of water 14 which may be, for example, the Pacific Ocean. The surface vessel 12 pendulously supports a hydraulic transport riser 16 which is coupled to an undersea nodule collector vehicle 18. The deep ocean mining operation is carried out as the surface vessel 12 moves the collector 18 along the ocean floor 20 on which a bed of manganese nodules 22 is located. As the collector 18 sweeps or traverses a particular area of the ocean floor, the nodules 22 are gathered and sorted by the collector and are entrained in a stream of sea water flowing upwardly through the riser 16 to the surface vessel where they are stored or transferred to another vessel. Circulation of sea water through the riser 16 is induced by an air injection sub 24 which discharges large quantities of air into the riser 16 at a suitable subsurface elevation. This airlift system creates a lower hydrostatic pressure within the riser as compared to the hydrostatic pressure of fluid surrounding the riser 16.

The riser 16 is a relatively rigid steel pipestring which is pendulously suspended from a suitable gimbol bearing system carried on the deck of the ship 12. The dump sub 10 is coupled to the collector 18 through a flexible riser 26 which allows the collector vehicle 18 to follow the contour of the ocean floor 20.

A relief valve 28 is connected to the dump sub 10 in series relation with the flexible riser 26. The pressure relief function of the relief valve 28 is particularly useful in the event that fluid flow is blocked or hindered in the collector vehicle 18 or flexible riser 26. For instance, if there is an obstruction in the collector or clogging in the flexible riser 26, and intake flow is restricted, the pumps (not shown) which drive the air injection sub 24 may cavitate or their drive motors may become overloaded, or the riser may collapse due to an excessive suction condition. The relief valve 28 prevents such disorders by admitting water into the riser to equalize the pressure therein relative to the ambient pressure in response to an excess differential pressure condition.

During normal mining operations, with the airlift system functioning satisfactorily, nodules 22 gathered by the collector vehicle 18 are entrained within the stream of sea water which enters first into the flexible riser 26 and thereafter through the relatively rigid riser 16 upwardly to the surface vessel 12. For purposes of this specification, the mixture formed by the nodules entrained within the moving stream of sea water will be defined as slurry. When the airlift system is operating, the suction induced in the riser causes the internal pressure of the riser to be relatively less than the hydraulic pressure exerted by the surrounding body of water 14. For purposes of this specification, positive and negative pressures referred to herein in conjunction with fluids in valves, conduits or other undersea apparatus are defined as being positive or negative in relation to and respectively greater than or less than the ambient fluid pressure surrounding dump sub 10, for example, the ambient ocean water pressure at the elevation of the dump sub. Thus, when the airlift pumps are operating, the ambient water pressure is higher than the internal pressure of the riser which causes sea water to be forced into the collector and upwardly through the riser. The nodules 22 in the path of the collector are picked up and are entrained into the moving stream of sea water in a manner similar to the operation of a vacuum sweeper.

When, in the course of operations, the airlift system fails or is deliberately shut down, or the flow passage becomes blocked for any reason, the lifting force developed by the suction of the moving stream of water is interrupted, and the nodules 22 fall back down through the flow passage of the riser. Packing of the nodules on top of the collector may cause structural damage or may cause it to be jammed. Additionally, the flow passage of the riser will become bridged over by the long column accumulation of nodules, thereby obstructing the flow passage. Therefore, it is necessary for practical deep ocean mining operations to provide a dump valve attachment for the riser in order to rapidly evacuate the descending nodules in the event of either a planned or accidental interruption of slurry flow through the riser.

According to the invention, the nodule dumping function is carried out by the dump sub 10. Referring now to FIG. 2, the dump sub 10 is formed by the combination of a hydraulic actuator assembly 30 which is mechanically coupled to and connected in fluid communication with a dump valve assembly 32. The dump sub 10 is furnished with an upper tubular tool joint weldment 34 for connection to the lower end of the relatively rigid riser 16, and is also furnished with a lower tubular tool joint weldment 36 for connection to the relief valve 28. The upper tool joint weldment 34 is terminated by an internally threaded box connector 38, and the lower tool joint weldment 36 is terminated by an externally threaded pin connector 40. Thus the dump sub comprises four main components, the upper and lower tool joints 34, 36, the hydraulic actuator assembly 30 and the dump valve assembly 32. These four components are connected together by tubular coupling sections 41 to define a longitudinally extending flow passage as indicated by the arrow 42. The dump valve assembly is preferably equipped with internally threaded tool joints at each end for interconnection with the tubular sections 41. With the exception of a designated region within the hydraulic actuator, the diameter of the internal bore of each component is preferably substantially equal to the bore diameter of the riser 16. The actuator assembly 30 is coupled to the dump valve assembly 32 by a yoke 44. The hydraulic actuator assembly 30 is operably responsive to pressure changes within the flow passage 42 relative to the pressure exerted by the surrounding body of water to open and close the dump valve assembly 32.

Figure 5:
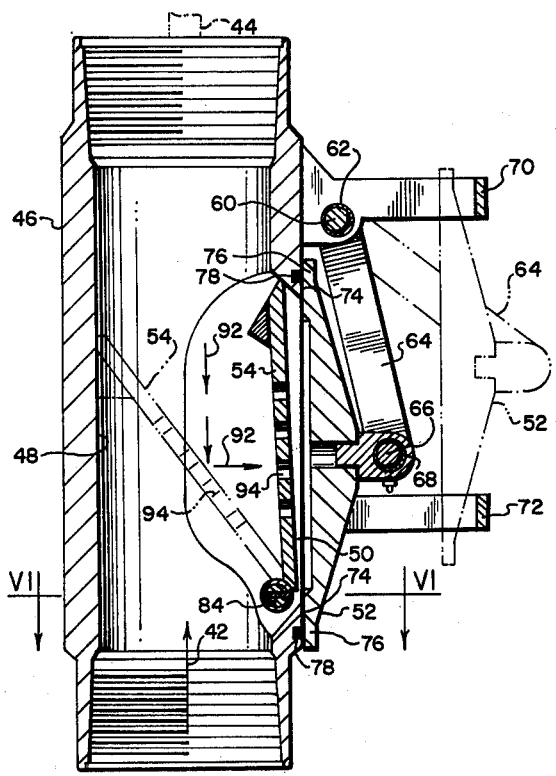
FIG. 5 is a longitudinal sectional view taken along the line V—V of FIG. 4.
Figure 6:
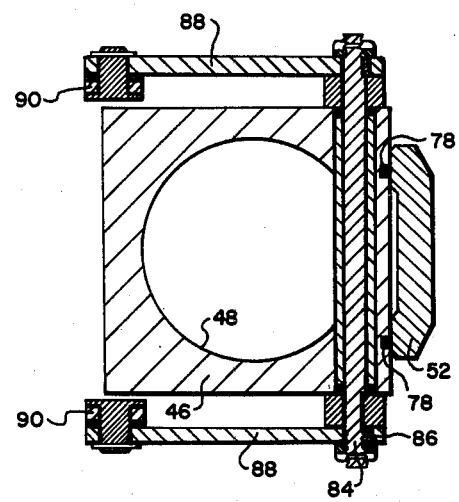
FIG. 6 is a transverse sectional view of the dump valve assembly taken along the line VI—VI in FIG. 5.
Figure 7:
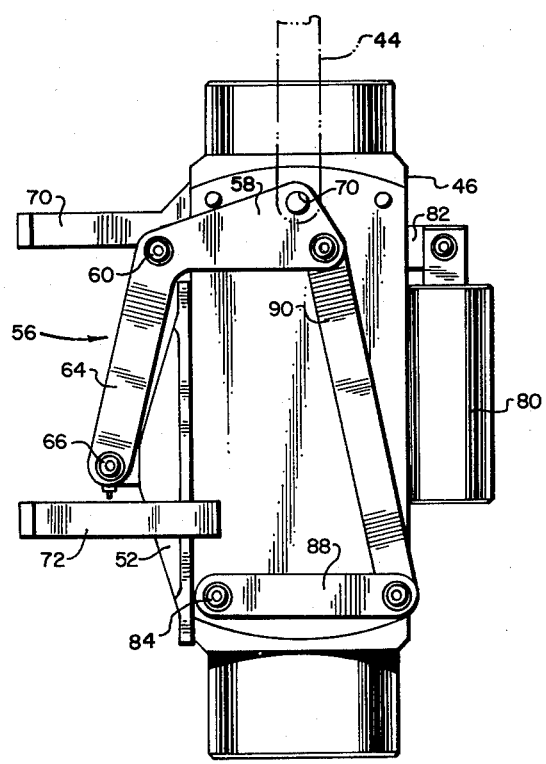
FIG. 7 is a rear elevation view of the dump valve assembly.
Figure 8:
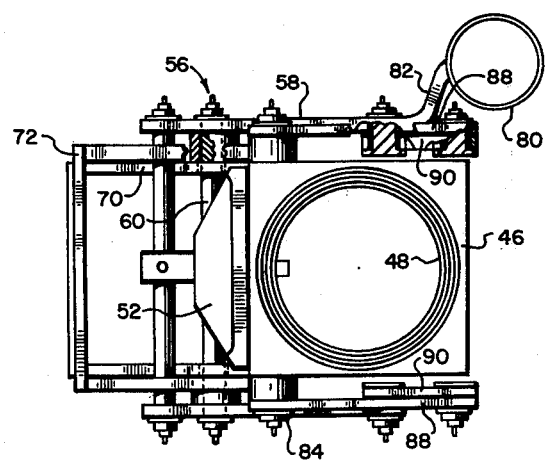
FIG. 8 is an end view, looking up, of the dump valve assembly.
Figures 9, 10:
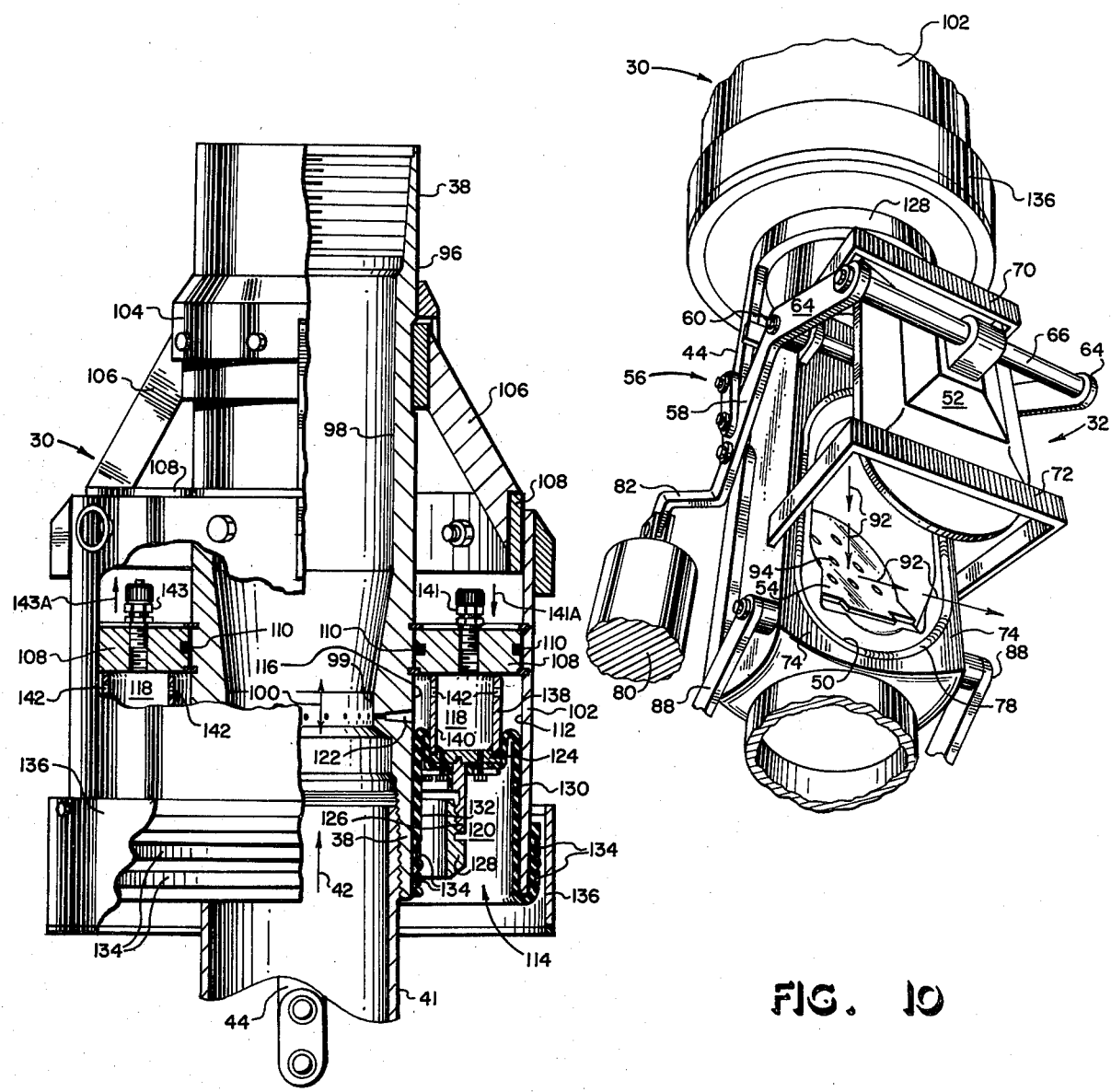
FIG. 9 is a side elevation view, partly in section, of the hydraulic actuator assembly shown in FIG. 2; and, FIG. 10 is a perspective view of the dump valve assembly showing the relative positions of the valve components in the dump mode of operation.

Turning now to FIGS. 5 and 10, the dump valve assembly 32 comprises generally an elongated tubular housing 46 having a bore 48 aligned with the flow passage 42. The tubular housing 46 has a sidewall opening 50 defining a dump port in communication with the bore 48. A cover plate 52 is mounted on the tubular housing 46 for movement from a position of sealing engagement with the dump port 50 to the open port dump position as illustrated in FIG. 10. A deflector plate 54 is mounted within the bore 48 of the tubular housing for movement from a clear passage position to a dump position. As illustrated in FIG. 10, the deflector plate 54 extends from the dump port 50 transversely through the flow passage 42 defined by the bore 50 thereby defining a bypass channel for diverting flow through the dump port. The deflector plate preferably is steeply inclined with respect to the flow passage 42 to enhance the diversion of nodules and to prevent bridging.

As the cover plate moves toward the dump port during closure, it is subjected to an increasingly stronger driving force in response to the pressure difference between the interior of the riser conduit and the pressure exerted by the surrounding water. If uncontrolled, the cover plate will be accelerated as it nears the dump port and will be severely impacted against the dump port housing 46, thereby causing structural damage to itself or to the housing. According to an important feature of the invention, movement of the cover plate is stabilized and its impact force is reduced by coordinating the movement of the deflector plate with the cover plate so that the dump port 50 is closed substantially simultaneously on both sides by the deflector plate and by the cover plate. The cover plate 52 and deflector plate 54 are interconnected by a control linkage assembly 56 for coordinating movement of the cover plate 56 relative to movement of the deflector plate 54 whereby the cover plate is moved to the position of sealing engagement with the dump port when the deflector is moved to the clear passage position as indicated in FIG. 2, and wherein the cover plate is moved to the open port dump position when the deflector plate is in the transverse dump position as indicated in FIG. 10. According to this arrangement, the differential pressure force acting upon the cover plate is reduced substantially by the deflector plate as it approaches the dump port during closure. As the deflector plate moves to its final clear passage position, it restricts the flow of fluids through the dump port, causing more fluids to move from below the port than is moved through it, thus assisting in preventing a slamming shut of the cover plate over the dump port.

Referring now to FIGS. 3–8, the control linkage assembly 56 is formed by a lever arm 58 which is connected to a shaft 60 which projects laterally through the dump valve housing 46. The shaft 60 is received within a sleeve bearing 62 to permit rotation of the shaft 60 and lever arm 58. An angular extension 64 of the lever arm 58 is pivotally connected to a tie bar 66 which is coupled to the cover plate 52. The tie bar 66 is journalled for rotation in a bearing 68 mounted on the top of the cover plate 52. The shaft 60 and tie bar 66 are interconnected in a similar manner by an angular extension 64 on the opposite side of the assembly as can best be seen in FIG. 4. The lever arm 58 is provided with a coupling eye 71 for engaging the yoke 44.

Downward displacement of the yoke 44 causes a counterclockwise rotation of the lever arm 58, which lifts the cover plate from engagement with the dump port and drives it to the fully open port position as indicated in phantom outline in FIG. 3. Upward displacement of the yoke 44 causes clockwise rotation of the lever arm 58 with respect to the fixed pivotal axis of the shaft 60, thereby driving the cover plate into sealing engagement with the dump port 50. Counterclockwise movement of the lever arm 58 and cover plate 52 is limited by a pair of retainer bars 70, 72 which prevents inversion of the cover plate with respect to the dump port.

It is important that a positive seal be formed by the engagement of the cover plate 52 with the peripheral portion 74 of the housing sidewall which defines the dump port 50. The cover plate 52 is provided with an annular flange portion 76 having a substantially planar face. Embedded within the peripheral portion 74 around the dump port 50 is a resilient gasket 78. The gasket 78 is deformable and projects slightly above the peripheral sealing surface 74. This arrangement provides an effective fluid-tight seal between the cover plate 52 and the dump port 50 to insure that the required pressure differential will be developed for operation of the actuator 30.

While this sealing engagement is referred to as a fluid-tight seal, it should be understood that a slight amount of leakage is permissible, and would only serve to reduce the efficiency of the flow in the riser 16. The ideal situation is, of course, to provide a completely fluid-tight seal, and the sealing engagement described herein approaches this ideal situation. If a slight amount of fluid leakage occurs, the hydraulic actuator will still function properly, but if the leakage becomes excessive, it is apparent that it will interfere with operation of the riser. Accordingly, the expression "effective fluid-tight seal" as used herein is intended to comprehend a sealing arrangement which permits either no leakage or only a slight amount of leakage.

The cover plate 52 is biased for movement toward the open port position by a counterweight 80 which is pivotally attached to an extension 82 of the lever arm 58. With this arrangement, the counterweight 80 biases the cover plate 52 to the open port position, and increases the threshold force required to close the cover plate.

The deflector plate 54 is similarly connected to a shaft 84 which extends laterally across the housing 46 and is journalled for rotation within a sleeve bearing 86. A lever arm 88 is pivotally connected to the deflector plate shaft 84 on each side of the assembly. Motion of the lever arm 58 is transmitted to the lever arm 88 through a connecting link 90 which is pivotally connected at opposite ends to the lever arm 88 and lever arm 58, respectively.

According to this arrangement, downward displacement of the yoke 44 causes counterclockwise rotation of the lever arm 58 with respect to the pivotal axis of the shaft 60, thereby driving the cover plate to the open port position, while also driving the lever arm 88 in a counterclockwise direction, thereby causing the deflector plate to be extended transversely through the flow path 42 until it engages the opposite sidewall bore of the housing 46. In this position, the deflector plate defines a bypass channel for diverting flow through the dump port 50. The flow passage 42 is closed off, and descending nodules strike the deflector plate and are diverted through the open dump port 50 as indicated by the arrows 92.

As can best be seen in FIG. 10, the deflector plate 54 is formed to closely engage the bore 58 of the housing 46 when resting in the transverse deflecting position. It is to be expected that a certain amount of silt or sand may be entrained within the nodule slurry which under some circumstances might accumulate along the interface of the deflector plate and the bore 48, thereby forming a seal which might be difficult to overcome when it is desired to reestablish slurry flow. Accordingly, a number of drainage openings 94 are formed through the deflector plate to ensure that a seal between the deflector plate and the bore of the housing will not be established.

In a typical deep ocean mining operation, the riser may extend as much as fifteen thousand feet or more from the collector vehicle 18 traversing the ocean floor to the surface vessel 12. The dump sub 10 is typically connected intermediate the flexible riser 26 and the relatively rigid riser 16 in a location which is relatively inaccessible with respect to the surface vessel. Therefore it is important to have the ability to automatically evacuate the entrained nodules 22 from the riser without the requirement of supervision, and without the requirement of providing auxiliary actuating power for driving the control linkage assembly 56. It is therefore desirable to provide a subsea actuator which derives its operating power from the available pressure differential developed by the flow of slurry through the riser, which will be substantially nonresponsive to the pressure fluctuations associated with normal slurry flow, and yet which will open the dump valve assembly substantially immediately upon predetermined change of pressure within the riser which corresponds with the interruption of slurry flow or with the reduction of flow rate to a level which will not sustain the entrainment of the nodules. The actuator must also be capable of automatically closing the dump valve assembly in response to the resumption of fluid flow through the riser at a rate sufficient to entrain the nodules.

Referring now to FIGS. 2 and 9, the hydraulic actuator assembly 30 is operably responsive to pressure changes within the riser flow passage 42 relative to the ambient pressure exerted by the surrounding body of water to open and close the dump valve assembly 32. The hydraulic actuator is formed by a tubular housing 96 having a longitudinally extending bore 98 which defines a continuation of the flow passage 42. The bore 98 is provided with a stepped portion 99 which projects radially inwardly thereby forming a flow restriction path or venturi flow region 100. The bore 98 is stepped rather abruptly at the entrance of the venturi flow region 100, and is slightly flared leading away from the downstream boundary of the venturi flow region. The stepped bore 99 will be referred to hereinafter as being the throat of the venturi flow region.

Concentrically disposed about the tubular housing 96 is a pressure chamber housing 102 which is rigidly attached thereto by a retainer ring 104 and brace assembly 106. The brace assembly 106 is coupled to the pressure chamber housing 102 through a retainer ring 108. The pressure chamber housing 102 is sealed against the tubular housing 96 by an annular head plate 108. The bore of the pressure chamber housing is sealed against the annular head plate 108 by a gasket 110, and the annular head plate 108 is also sealed against the exterior of the flow passage housing 96 by an annular gasket 110.

A rolling diaphragm piston assembly 114 is disposed in slidable, sealed engagement with the bore of the pressure chamber housing 102 and with the exterior surface 116 of the flow passage housing 96. An annular cavity or chamber 112 is formed intermediate the pressure chamber housing 102 and the exterior surface 116 of the flow passage housing 96. The annular pressure chamber 112 is divided by the piston assembly into a sealed pressure chamber 118 and an open ended pressure chamber 120 on the opposite side of the piston assembly. According to an important feature of the invention, the open ended pressure chamber 120 is exposed to pressurization by an external source of fluid pressure such as the surrounding body of water, while the sealed pressure chamber 118 is connected in fluid communication with the venturi passage 100. The chamber 120 is open ended and therefore is connected directly in fluid communication with the surrounding body of water, while the stepped sidewall portion 99 of the tubular flow passage housing 69 is provided with several orifices 122 which extend from the venturi zone 100 through the stepped bore 99 into the sealed pressure chamber 118. Each orifice 122 provides metered flow from the venturi region 100 into the sealed pressure chamber 118 so that the internal pressure within the sealed pressure chamber 118 is substantially equal to the hydraulic pressure in the throat of the venturi region at all times. The orifices 122 are preferably angularly spaced with respect to each other around the circumference of the housing 96.

The piston assembly 114 includes an annular piston ring 124, a connector collar 126, a control collar weldment 128 connected in threaded engagement with the collar 126, and a pair of concentrically mounted cylindrical diaphragms 130, 132 which cooperate with the annular piston ring to form a rolling seal. Each diaphragm is fastened at its upper end to the annular piston ring 124, with the outer diaphragm 130 extending along the bore of the pressure chamber housing 102 with its lower end being securely fastened to the external surface of the pressure chamber housing by a plurality of band fasteners 134. The inner diaphragm 132 extends along the exterior surface 116 of the flow passage housing 96 with its lower end being securely fastened to the tubular housing 96 by bands 134. The banded end of the pressure chamber assembly is partially enclosed and protected by a cylindrical shroud 136.

Securely fastened to the annular piston ring 124 are a pair of concentrically mounted spacer rings 138, 140 which limit the travel of the piston within the pressure chamber. Each spacer ring is provided with a flow port 142 to prevent sealing of the piston against the annular head plate 108.

During normal flow conditions, a relatively low hydraulic pressure condition is induced within the throat of the venturi passage 100. Because of the venturi passages 122 connected in fluid communication with the sealed pressure chamber 118, the sealed pressure chamber 118 becomes pressurized at a level substantially equal to the hydraulic pressure within the venturi passage. With the upper side of the piston 124 being exposed to this relatively low hydraulic pressure, and the lower side of the piston being exposed to the relatively high ambient pressure of the surrounding body of water, a pressure differential is produced across the piston which causes it to be retracted until the spacer rings 138, 140 are driven into engagement with the annular head plate 108. The control collar weldment 128 is connected to the yoke 44 and thereby drives the cover plate 52 to its closed position and the deflector plate 54 is retracted to the clear passage position in response to retraction of the piston.

Should substantial interruption of the slurry flow occur for any reason, pressure within the venturi region 100 equalizes to that above and below the venturi. This also causes the pressure in the sealed chamber 118 to eventually become equalized, or nearly so, with that of the surrounding sea water. At this time, the counterweight 80 acting through its associated pivots and arms acts to pull the piston 124 to its extended position, open its dump port cover plate, and move the deflector plate 54 to its closed passage position. Should the slurry density of the fluid inside the eductor riser 16 be substantially higher than that of the surrounding sea water, a relatively high pressure is developed within the venturi region 100 because of the greater density of the slurry mixture relative to the density of the surrounding body of water. This causes the sealed pressure chamber 118 to be equalized with the pressure exerted by the surrounding body of water, thereby extending the piston 124, opening the cover plate 52 and extending the deflector plate 54 to the dump position.

The hydraulic pressure drop in the throat of the venturi region 100 may exceed the pressure limitations of the flexible diaphragms 130, 132. This pressure drop is relieved by a pressure relief valve 141 which is connected in fluid communication with the sealed pressure chamber 118. The pressure relief valve 141 is normally closed but is set to open inwardly as indicated by the arrow 141A in response to a predetermined pressure differential into the sealed pressure chamber 118 relative to the pressure exerted by the surrounding body of water.

Should the portion of the riser 16 in or near the dump valve itself contain a slurry whose density is greater than that of the surrounding sea water, it is conceivable that pressures in chamber 118 may exceed the pressure limitations of the extended flexible diaphragms 130, 132. Accordingly another pressure relief valve 143 similar to valve 141 is placed on top of plate 108 but arranged to open outwardly to the sea as indicated by the arrow 143A, rather than inwardly from the sea. One or more of these valves may be used and, preferentially in the design shown here, may be disposed alternately in the same "bolt circle" as the relief valve 141. This valve, because its requirement is to protect the extended rolling diaphragms in an essentially unsupported manner, must open at a substantially predetermined lower valve than the inwardly opening valve 142, usually by a factor of ten.

After the nodules have been dumped, the cover plate and the deflector plate are temporarily maintained in the dump position by the hydraulic actuator since with the dump port open, the pressure in the venturi region 100 is equal to the ambient pressure, and the pressure of the sealed pressure chamber 118 is therefore substantially equal to the pressure exerted by the surrounding body of water, that is, the pressure directed against the lower side of the piston 124, thereby dissipating the buildup of a hydraulic pressure difference across the piston. According to preferred practice, slurry flow is reestablished by activating the air injection sub 24 and circulating water through the open dump port 50 and through the riser. As the flow rate through the open dump port and upwardly through the unloaded riser increases, the hydraulic pressure level in the throat of the venturi region 100 drops, thereby inducing a pressure difference across the piston 124 and causing it to be driven to its fully retracted position. Retraction of the piston 124 drives the cover plate 52 to its position of sealing engagement with the dump port, and also drives the deflector plate 54 to its clear passage position. As the cover plate is driven into sealing engagement with the dump port, the suction force developed by the circulation of water through the dump port 50 into the upper riser 16 is applied directly through the lower riser 26 as the deflector plate rotates into the clear passage position, thereby reestablishing slurry flow from the collector vehicle 18 upwardly through the riser to the surface vessel 12.

Although the invention as disclosed in the foregoing description of a preferred embodiment has particular utility for deep ocean mining operations, those skilled in the art will appreciate that the apparatus of the invention may be used to good advantage in other fields of application in which particulated solids are conveyed over great distances or elevations by entraining the solids in a fluid transport medium. It should be apparent, therefore, that various changes, substitutions and alterations can be made without departing from the spirit and scope of the invention as defined by the appended claims.

What is claimed is:

1. An automatic dump valve comprising, in combination:

an elongated tubular conduit defining a longitudinally extending flow passage, the elongated tubular conduit having a sidewall opening defining a dump port in communication with the flow passage and having a sidewall portion projecting radially into the flow passage thereby defining a venturi flow region;

an elongated tubular housing mounted in spaced relation around the elongated tubular conduit defining an annular chamber;

said sidewall portion of the elongated tubular conduit having an opening connecting the annular chamber in fluid communication with the venturi flow region;

a fixed annular seal interconnecting the elongated tubular conduit in sealed engagement with the elongated tubular housing at one end of the annular chamber;

an annular piston assembly disposed for movement through the chamber in sealed engagement with the elongated tubular conduit and housing thereby dividing the annular chamber into a first chamber communicating with the venturi flow region and a second pressure chamber communicating with an external source of fluid pressure;

a deflector plate mounted within the elongated tubular conduit for movement from a clear passage position wherein the deflector plate is retracted substantially out of the flow passage to a dump position wherein the deflector plate is extended from the dump port transversely through the flow passage thereby defining a bypass channel for diverting flow through the dump port;

a cover plate mounted on the tubular conduit for movement from a position of sealing engagement with the dump port to an open port position;

control linkage interconnecting the deflector plate and cover plate for coordinating movement of the cover plate relative to movement of the deflector plate whereby the cover plate is moved to the position of sealing engagement with the dump port as the deflector plate is moved to the clear passage position, and the cover plate is moved to the open port position as the deflector plate is moved to the dump position; and, force transmitting linkage interconnecting the control linkage and the annular piston for moving the cover plate and deflector plate in response to extension or retraction of the piston.

2. An automatic dump valve comprising, in combination:

an elongated tubular housing defining a longitudinally extending flow passage, said flow passage housing having a sidewall opening defining a dump port in communication with said flow passage, and a sidewall portion constricting said flow passage thereby defining a venturi flow region;

a cover plate mounted on said flow passage housing for movement from a position of sealing engagement with said dump port to an open port position; and, a linear actuator mounted on said flow passage housing and having a piston assembly coupled in driving relation to said cover plate, said actuator being divided by said piston assembly into a first chamber in fluid communication with said venturi flow region, and a second chamber being connected in fluid communication with an external fluid pressure source, said piston assembly being responsive to a first fluid pressure condition in said first chamber to drive said cover plate in a first direction to open said dump port, said piston assembly being responsive to a second fluid pressure condition in said first chamber to drive said cover plate in a second direction to close said dump port;

a deflector plate mounted within said flow passage housing and coupled to said piston assembly for movement from a clear passage position to a dump position wherein said deflector plate is extended from said dump port transversely through said flow passage thereby defining a bypass channel for diverting flow through said dump port; and, control linkage interconnecting said deflector plate and said cover plate for coordinating their movement wherein said cover plate is moved to the position of sealing engagement with said dump port as said deflector plate is moved to the clear passage position, and said cover plate is moved to the open port position as said deflector plate is moved to the dump position.

3. The automatic dump valve as defined in claim 2, including a counterweight coupled to said control linkage for biasing the cover plate and deflector plate for movement toward the open port, clear passage positions, respectively.

4. An automatic dump valve comprising, in combination:

an elongated tubular housing defining a longitudinally extending flow passage, said flow passage housing having a sidewall opening defining a dump port in communication with said flow passage, and a sidewall portion constricting said flow passage thereby defining a venturi flow region;

a cover plate mounted on said flow passage housing for movement from a position of sealing engagement with said dump port to an open port position; and, a linear actuator mounted on said flow passage housing and having a piston assembly coupled in driving relation to said cover plate, said actuator being divided by said piston assembly into a first chamber in fluid communication with said venturi flow region, and a second chamber being connected in fluid communication with an external fluid pressure source, said piston assembly being responsive to a first fluid pressure condition in said first chamber to drive said cover plate in a first direction to open said dump port, said piston assembly being responsive to a second fluid pressure condition in said first chamber to drive said cover plate in a second direction to close said dump port, wherein said actuator comprises a tubular pressure chamber housing mounted in spaced relation around the flow passage housing and sealed at one end thereto defining an annular pressure chamber, said piston assembly including an annular piston ring disposed for movement through said annular pressure chamber in sealed engagement with said flow passage housing and said pressure chamber housing thereby dividing said annular pressure chamber into a sealed pressure chamber communicating with said venturi flow region and an open pressure chamber communicating with said external fluid pressure source.

5. The automatic dump valve as defined in claim 4 including a pair of concentrically mounted, inner and outer resilient diaphragms each fastened on one end to said piston ring, said outer diaphragm extending along the interior surface of said pressure chamber housing and secured thereto near the outer boundary of said open pressure chamber, and said inner diaphragm extending along the exterior surface of said flow passage housing and secured thereto near the outer boundary of said open pressure chamber.

6. The automatic dump valve as defined in claim 4, and including a pressure relief valve connected in fluid communication with said first pressure chamber for relieving the buildup of pressure therein exceeding a predetermined level.

7. The automatic dump valve as defined in claim 4 including a pressure relief valve connected in fluid communication with said first pressure chamber for relieving pressure drops therein exceeding a predetermined level.

8. The automatic dump valve as defined in claim 4 wherein:

said cover plate is mounted for pivotal movement with respect to said dump port, and said dump valve includes bars mounted on said flow passage housing and projecting through the pathway of said cover plate for engaging said cover plate as it approaches its limit of travel.

9. An automatic dump valve comprising, in combination:

an elongated tubular housing defining a longitudinally extending flow passage, said flow passage housing having a sidewall opening defining a dump port in communication with said flow passage, and a sidewall portion constricting said flow passage thereby defining a venturi flow region;

a cover plate mounted on said flow passage housing for movement from a position of sealing engagement with said dump port to an open port position; and, a linear actuator mounted on said flow passage housing and having a piston assembly coupled in driving relation to said cover plate, said actuator being divided by said piston assembly into a first chamber in fluid communication with said venturi flow region, and a second chamber being connected in fluid communication with a fluid pressure source, said piston assembly being responsive to a first fluid pressure condition in said first chamber to drive said cover plate in a first direction to open said dump port, said piston assembly being responsive to a second fluid pressure condition in said first chamber to drive said cover plate in a second direction to close said dump port;

a deflector plate mounted within said flow passage housing and coupled to said piston assembly for movement from a clear passage position to a dump position wherein said deflector plate is extended from said dump port transversely through said flow passage thereby defining a bypass channel for diverting flow through said dump port; and, means connected to said deflector plate and said cover plate for coordinating their movement wherein said cover plate is moved to the position of sealing engagement with said dump port as said deflector plate is moved to the clear passage position, and said cover plate is moved to the open port position as said deflector plate is moved to the dump position.

* * * * *

UNITED STATES PATENT AND TRADEMARK OFFICE
CERTIFICATE OF CORRECTION

PATENT NO. : 4,300,585

DATED : November 17, 1981

INVENTOR(S) : Donald F. Taylor

It is certified that error appears in the above—identified patent and that said Letters Patent is hereby corrected as shown below:

Column 10, line 20, "69" to --96--.

Claim 1, column 12, line 51, after "first" add --pressure--.

Signed and Sealed this

Third Day of August 1982

[SEAL]

Attest:

GERALD J. MOSSINGHOFF

Attesting Officer     Commissioner of Patents and Trademarks